US008264722B2

(12) United States Patent
Mathur et al.

(10) Patent No.: US 8,264,722 B2
(45) Date of Patent: Sep. 11, 2012

(54) BUILDING DYNAMIC USER INTERFACES BASED ON INTERACTIVE QUERY OF DEVICE AND WORKFLOW CAPABILITIES

(75) Inventors: Alok Mathur, Rancho Santa Margarita, CA (US); Fabio Gava, Ladera Ranch, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 715 days.

(21) Appl. No.: 12/417,765

(22) Filed: Apr. 3, 2009

(65) Prior Publication Data
US 2010/0257445 A1    Oct. 7, 2010

(51) Int. Cl.
*G06F 15/00* (2006.01)
*G06F 17/00* (2006.01)
(52) U.S. Cl. .................... 358/1.15; 715/234
(58) Field of Classification Search ............. 358/1.15
See application file for complete search history.

(56) References Cited

U.S. PATENT DOCUMENTS
6,148,346 A * 11/2000 Hanson .................. 719/321
* cited by examiner

*Primary Examiner* — Saeid Ebrahimi Dehkordy
(74) *Attorney, Agent, or Firm* — SoCal IP Law Group LLP; Steven C. Sereboff; Jonathan Pearce (57) ABSTRACT

The subject application is directed to a document processing device user interface system and method having functional controls specified by device attribute querying. A plurality of components associated with a document processing device is queried, and device information data corresponding to operational characteristics of each component is received in accordance with the query. Device operation data corresponding to a selected document processing operation is then received via an associated user interface and is compared relative to the device operation data. Indicia is generated on the user interface display corresponding to controls of a subset of the components based upon the comparison output. Secondary selection data corresponding to selected indicia on the display is received, and the selected document processing operation is commenced in accordance with the received secondary selection data.

12 Claims, 11 Drawing Sheets

BUILDING DYNAMIC USER INTERFACES BASED ON INTERACTIVE QUERY OF DEVICE AND WORKFLOW CAPABILITIES

BACKGROUND OF THE INVENTION

The subject application is directed generally to control of operation of document processing devices. The application is particularly directed to display and selection of device controls that are contingent on a testing of device properties, coupled with document processing operation selected by a user.

Document processing devices in widespread use today include scanners, printers, facsimile machines, and printers. More recently, two or more of these functions are provided in a single device, which is referred to as a multifunction peripheral (MFP) or multifunction device (MFD).

Modern document processing devices are extremely powerful, and many options are available to users. By way of example, in a printing system, a user may select a paper size, a paper tray for stock, an output bin, and options such as collation, stapling, hole punch, N-up, or the like. The variety of such options has led to more user-friendly controls through graphical user interfaces, including touch screen controls. An interface is typically programmed by a device supplier so as to allow for ease in operation by relatively unsophisticated users. However, there are a variety of configurations associated with individual devices.

By way of further example, some devices may not have stapling capabilities, or some devices may not have facsimile capabilities. Still other devices may be networked, while others may not, which will lead to document storage or routing options that will be dictated accordingly.

It is incumbent on a device supplier to have user controls that are created for all possible system configurations. Additionally, some systems may be altered during operation, such as by a change in a paper tray or by running out of staples, which situations may alter an ability of a device to operate in a fashion contemplated by preprogrammed user controls.

SUMMARY OF THE INVENTION

In accordance with one embodiment of the subject application, there is provided a system and method for a document processing device user interface having functional controls specified by device attribute querying. A plurality of components associated with a document processing device is queried, and device information data corresponding to operational characteristics of each of the plurality of components is received in accordance with a query thereof. Device operation data corresponding to at least one selected document processing operation for the document processing device is received via an associated user interface and is compared relative to received device operation data. Indicia is generated on an associated display of the user interface corresponding to controls of a subset of the plurality of components in accordance with an output of the comparison step, secondary selection data corresponding to at least one indicia on the display is received, and the selected document processing operation is commenced in accordance with received secondary selection data.

Still other advantages, aspects, and features of the subject application will become readily apparent to those skilled in the art from the following description, wherein there is shown and described a preferred embodiment of the subject application, simply by way of illustration of one of the modes best suited to carry out the subject application. As it will be realized, the subject application is capable of other different embodiments, and its several details are capable of modifications in various obvious aspects, all without departing from the scope of the subject application. Accordingly, the drawings and descriptions will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed to a system and method for controlling the operation of document processing devices. In particular, the subject application is directed to a system and method for the display and selection of device controls that are contingent on a testing of device properties, coupled with document processing operation selected by a user. It will become apparent to those skilled in the art that the system and method described herein are suitably adapted to a plurality of varying electronic fields employing graphical user interfaces including, for example and without limitation, communications, general computing, data processing, document processing, financial transactions, vending of products or services, or the like. The preferred embodiment, as depicted in FIG. 1, illustrates a document processing field for example purposes only and is not a limitation of the subject application solely to such a field.

Figure 1:
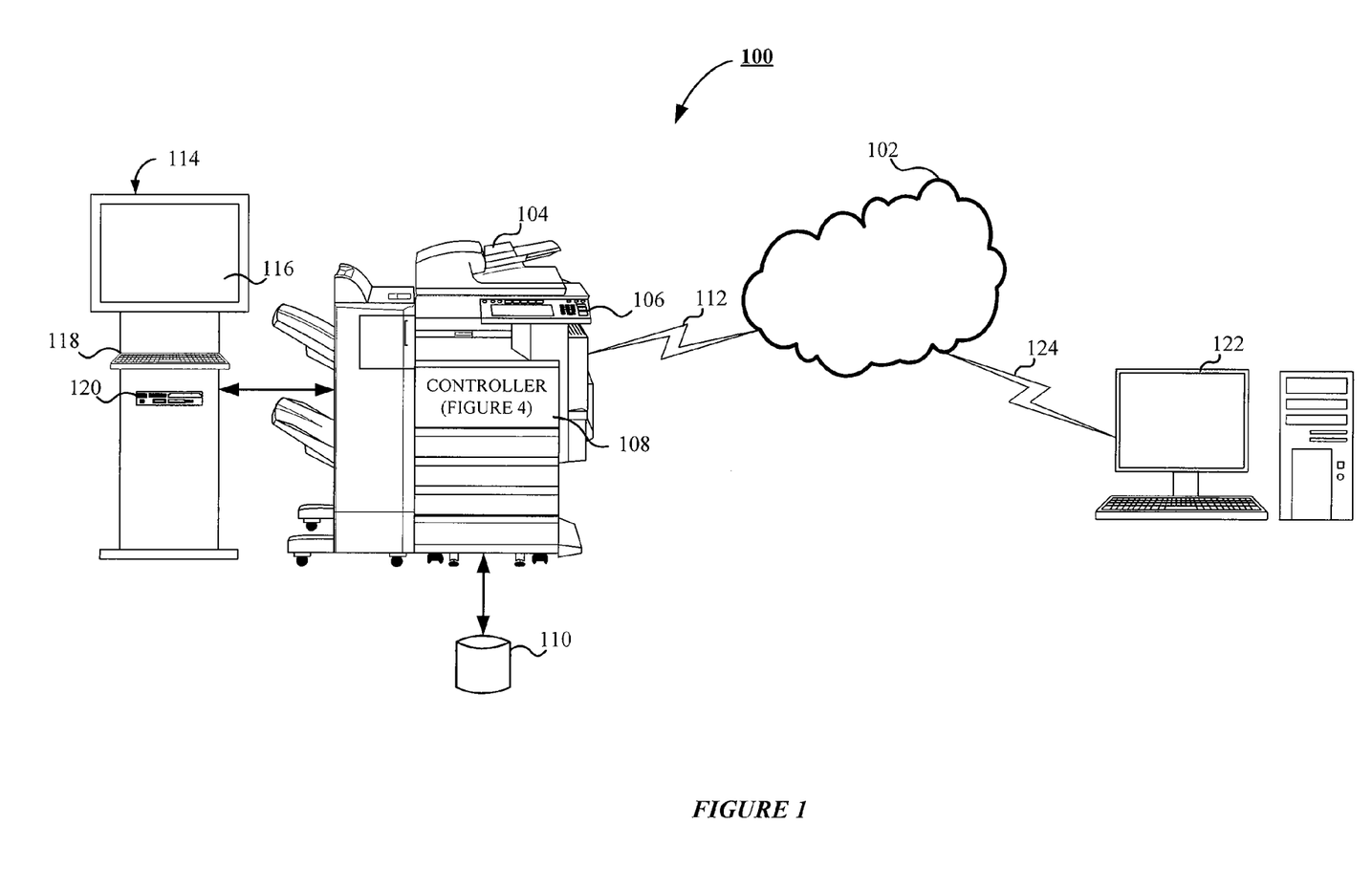
FIG. 1 is an overall diagram of a document processing device user interface system having functional controls specified by device attribute querying according to one embodiment of the subject application.

Referring now to FIG. 1, there is shown an overall diagram of a document processing device user interface system 100 having functional controls specified by device attribute querying in accordance with one embodiment of the subject application. As shown in FIG. 1, the system 100 is capable of implementation using a distributed computing environment, illustrated as a computer network 102. It will be appreciated by those skilled in the art that the computer network 102 is any distributed communications system known in the art that is capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or any suitable combination thereof. In accordance with the preferred embodiment of the subject application, the computer network 102 is comprised of physical layers and transport layers, as illustrated by the myriad conventional data transport mechanisms such as, for example and without limitation, Token-Ring, 802.11(x), Ethernet, or other wireless or wire-based data communication mechanisms. The skilled artisan will appreciate that, while a computer network 102 is shown in FIG. 1, the subject application is equally capable of use in a stand-alone system, as will be known in the art.

The system 100 also includes a document processing device 104, which is depicted in FIG. 1 as a multifunction peripheral device, suitably adapted to perform a variety of document processing operations. It will be appreciated by those skilled in the art that such document processing operations include, for example and without limitation, facsimile, scanning, copying, printing, electronic mail, document management, document storage, or the like. Suitable commercially-available document processing devices include, for example and without limitation, the Toshiba e-Studio Series Controller. In accordance with one aspect of the subject application, the document processing device 104 is suitably adapted to provide remote document processing services to external or network devices. Preferably, the document processing device 104 includes hardware, software, and any suitable combination thereof configured to interact with an associated user, a networked device, or the like.

According to one embodiment of the subject application, the document processing device 104 is suitably equipped to receive a plurality of portable storage media including, without limitation, Firewire drive, USB drive, SD, MMC, XD, compact flash, memory stick, and the like. In the preferred embodiment of the subject application, the document processing device 104 further includes an associated user interface 106, such as a touchscreen, LCD display, touch-panel, alpha-numeric keypad, or the like, via which an associated user is able to interact directly with the document processing device 104. In accordance with the preferred embodiment of the subject application, the user interface 106 is advantageously used to communicate information to the associated user and to receive selections from the associated user. The skilled artisan will appreciate that the user interface 106 comprises various components suitably adapted to present data to the associated user, as are known in the art. In accordance with one embodiment of the subject application, the user interface 106 comprises a display suitably adapted to display one or more graphical elements, text data, images, or the like to an associated user, to receive input from the associated user, and to communicate the same to a backend component such as the controller 108, as explained in greater detail below. Preferably, the document processing device 104 is communicatively coupled to the computer network 102 via a communications link 112. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art. The functioning of the document processing device 104 will be better understood in conjunction with the block diagrams illustrated in FIGS. 2 and 3, explained in greater detail below.

In accordance with one embodiment of the subject application, the document processing device 104 incorporates a backend component, designated as the controller 108, suitably adapted to facilitate the operations of the document processing device 104, as will be understood by those skilled in the art. Preferably, the controller 108 is embodied as hardware, software, or any suitable combination thereof configured to control the operations of the associated document processing device 104, to facilitate the display of images via the user interface 106, to direct the manipulation of electronic image data, and the like. For purposes of explanation, the controller 108 is used to refer to any of the myriad components associated with the document processing device 104, including hardware, software, or combinations thereof functioning to perform, cause to be performed, control, or otherwise direct the methodologies described hereinafter. It will be understood by those skilled in the art that the methodologies described with respect to the controller 108 are capable of being performed by any general purpose computing system known in the art, and thus the controller 108 is representative of such general computing devices and is intended as such when used hereinafter. Furthermore, the use of the controller 108 hereinafter is for the example embodiment only, and other embodiments, which will be apparent to one skilled in the art, are capable of employing the document processing device user interface system and method, having functional controls specified by device attribute querying. The functioning of the controller 108 will better be understood in conjunction with the block diagrams illustrated in FIGS. 4 and 5, explained in greater detail below.

Communicatively coupled to the document processing device 104 is a data storage device 110. In accordance with the one embodiment of the subject application, the data storage device 110 is any mass storage device known in the art including, for example and without limitation, magnetic storage drives, a hard disk drive, optical storage devices, flash memory devices, or any suitable combination thereof. In one embodiment, the data storage device 110 is suitably adapted to store scanned image data, modified image data, redacted data, user information, cellular telephone data, pre-set payment data, document data, image data, electronic database data, or the like. It will be appreciated by those skilled in the art that, while illustrated in FIG. 1 as being a separate component of the system 100, the data storage device 110 is capable of being implemented as an internal storage component of the document processing device 104, a component of the controller 108, or the like such as, for example and without limitation, an internal hard disk drive or the like. In accordance with one embodiment of the subject application, the data storage device 110 is capable of storing document processing instructions, usage data, user interface data, job control data, controller status data, component execution data, images, advertisements, user information, location information, output templates, mapping data, multimedia data files, fonts, and the like.

FIG. 1 also illustrates a kiosk 114 communicatively coupled to the document processing device 104, and in effect, the computer network 102. It will be appreciated by those skilled in the art that the kiosk 114 is capable of being implemented as a separate component of the document processing device 104 or as an integral component thereof. Use of the kiosk 114 in FIG. 1 is for example purposes only, and the skilled artisan will appreciate that the subject application is capable of implementation without the use of the kiosk 114. In accordance with one embodiment of the subject application, the kiosk 114 includes an associated display 116 and a user input device 118. As will be understood by those skilled in the art, the kiosk 114 is capable of implementing a combination user input device/display such as a touchscreen interface. According to one embodiment of the subject application, the kiosk 114 is suitably adapted to display prompts to an associated user, to receive document processing instructions from the associated user, to receive payment data, to receive selection data from the associated user, and the like. Preferably, the kiosk 114 includes a magnetic card reader, conventional bar code reader, or the like suitably adapted to receive and read payment data from a credit card, coupon, debit card, or the like.

The system 100 of FIG. 1 also includes a portable storage device reader 120 coupled to the kiosk 114 that is suitably adapted to receive and access myriad different portable storage devices. Examples of such portable storage devices include, for example and without limitation, flash-based memory such as SD, xD, memory stick, compact flash, CD-ROM, DVD-ROM, USB flash drives, or other magnetic or optical storage devices, as will be known in the art.

Depicted in FIG. 1 is an administrative device 122, illustrated as a personal computer in data communication with the computer network 102 via a communications link 124. It will be appreciated by those skilled in the art that the administrative device 122 is shown in FIG. 1 as a computer workstation for illustration purposes only. As will be understood by those skilled in the art, the administrative device 122 is representative of any personal computing device known in the art including, for example and without limitation, a laptop computer, a workstation computer, a personal data assistant, a web-enabled cellular telephone, a smart phone, a proprietary network device, or other web-enabled electronic device. The communications link 124 is any suitable channel of data communications known in the art including but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system or wired communications known in the art. Preferably, the administrative device 122 is suitably adapted to receive redacted documents, status data, job data, user interface data, and/or image data; to monitor document processing jobs; to employ thin-client interfaces; to generate display data; to generate output data; or the like with respect to the document processing device 104 or any other similar device coupled to the computer network 102.

Figure 2:
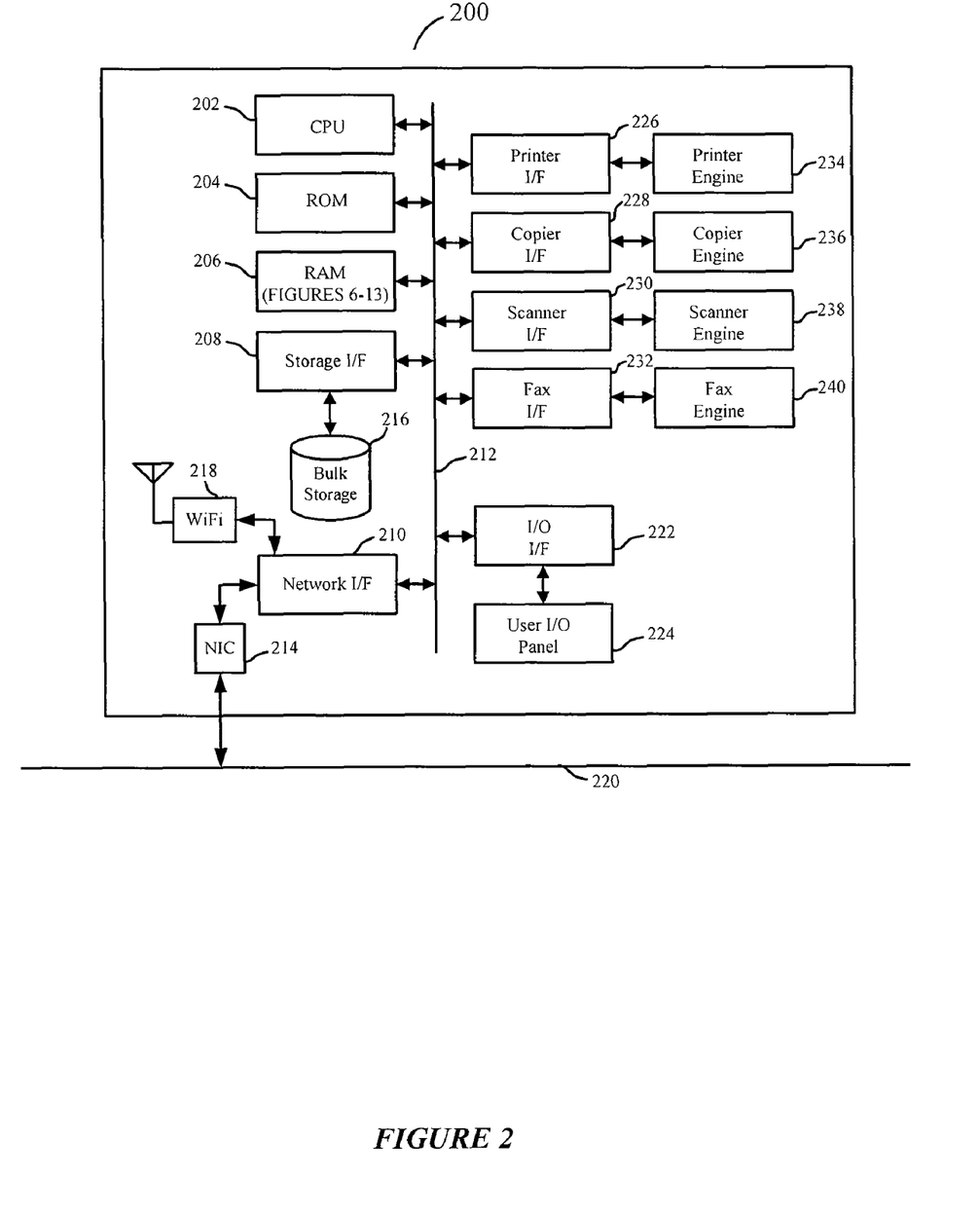
FIG. 2 is a block diagram illustrating device hardware for use in the document processing device user interface system having functional controls specified by device attribute querying according to one embodiment of the subject application.

Turning now to FIG. 2, illustrated is a representative architecture of a suitable device 200, shown in FIG. 1 as the document processing device 104, on which operations of the subject system are completed. Included is a processor 202 suitably comprised of a central processor unit. However, it will be appreciated that the processor 202 advantageously may be composed of multiple processors working in concert with one another, as will be appreciated by one of ordinary skill in the art. Also included is a non-volatile or read only memory 204, which is advantageously used for static or fixed data or instructions such as BIOS functions, system functions, system configuration data, and other routines or data used for operation of the device 200.

Also included in the device 200 is random access memory 206 suitably formed of dynamic random access memory, static random access memory, or any other suitable addressable memory system. Random access memory 206 provides a storage area for data instructions associated with applications and data handling accomplished by the processor 202.

A storage interface 208 suitably provides a mechanism for volatile, bulk, or long-term storage of data associated with the device 200. The storage interface 208 suitably uses bulk storage, such as any suitable addressable or serial storage such as a disk, optical, tape drive, and the like as shown as 216, as well as any suitable storage medium, as will be appreciated by one of ordinary skill in the art.

A network interface subsystem 210 suitably routes input and output from an associated network, allowing the device 200 to communicate to other devices. The network interface subsystem 210 suitably interfaces with one or more connections with external devices to the device 200. By way of example, illustrated is at least one network interface card 214 for data communication with fixed or wired networks such as Ethernet, Token-Ring, and the like and a wireless interface 218 suitably adapted for wireless communication via means such as WiFi, WiMax, wireless modem, cellular network, or any suitable wireless communication system. It is to be appreciated, however, that the network interface subsystem 210 suitably utilizes any physical or non-physical data transfer layer or protocol layer, as will be appreciated by one of ordinary skill in the art. In the illustration, the network interface card 214 is interconnected for data interchange via a physical network 220 suitably comprised of a local area network, wide area network, or a combination thereof.

Data communication between the processor 202, read only memory 204, random access memory 206, storage interface 208, and the network subsystem 210 is suitably accomplished via a bus data transfer mechanism, such as illustrated by the bus 212.

Suitable executable instructions on the device 200 facilitate communication with a plurality of external devices such as workstations, document processing devices, other servers, or the like. While, in operation, a typical device operates autonomously, it is to be appreciated that direct control by a local user is sometimes desirable and is suitably accomplished via an optional input/output interface 222 to a user input/output panel 224, as will be appreciated by one of ordinary skill in the art.

Also in data communication with the bus 212 are interfaces to one or more document processing engines. In the illustrated embodiment, printer interface 226, copier interface 228, scanner interface 230, and facsimile interface 232 facilitate communication with printer engine 234, copier engine 236, scanner engine 238, and facsimile engine 240, respectively. It is to be appreciated that the device 200 suitably accomplishes one or more document processing functions. Systems accomplishing more than one document processing operation are commonly referred to as multifunction peripherals or multifunction devices.

Figure 3:
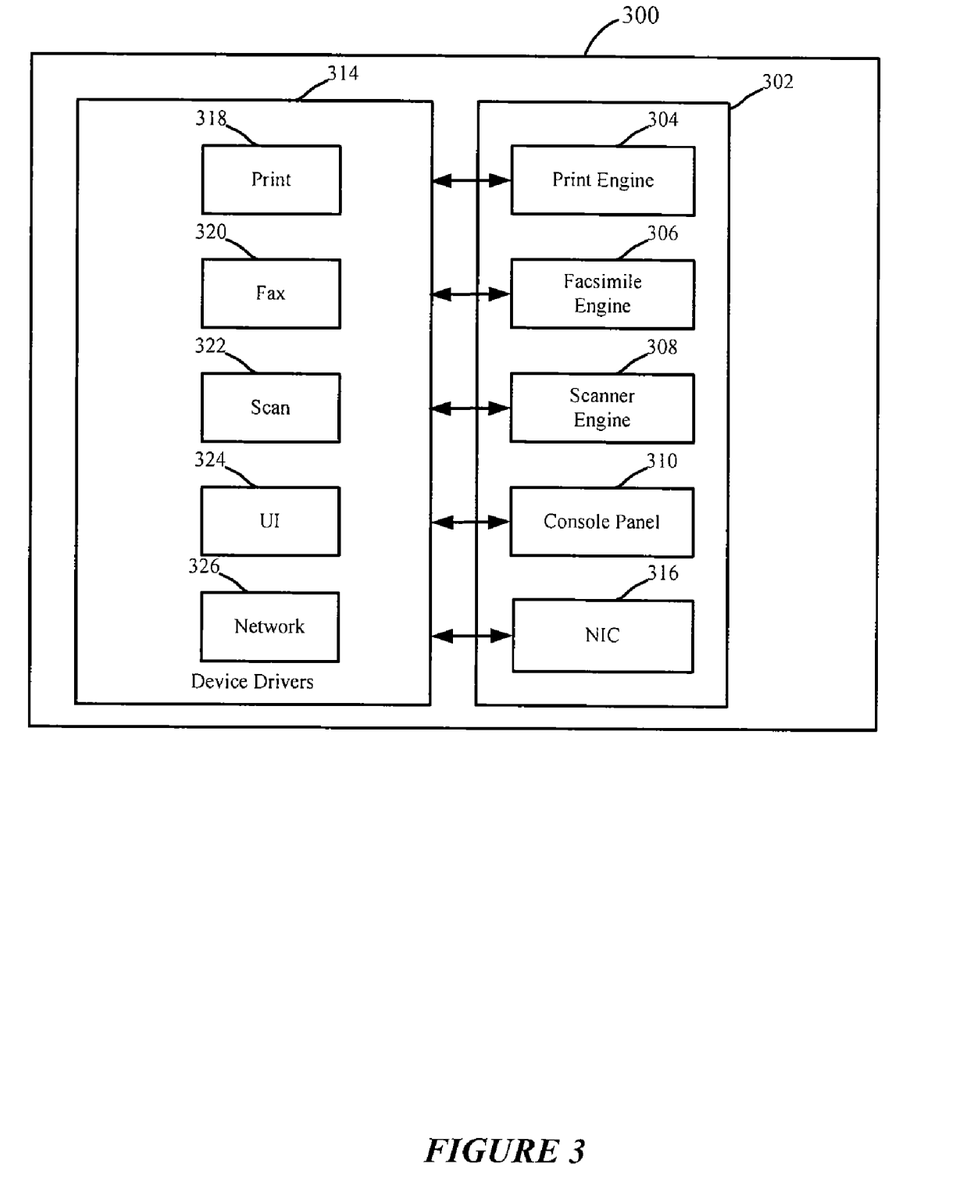
FIG. 3 is a functional diagram illustrating the device for use in the document processing device user interface system having functional controls specified by device attribute querying according to one embodiment of the subject application.

Turning now to FIG. 3, illustrated is a suitable document processing device 300, depicted in FIG. 1 as the document processing device 104, for use in connection with the disclosed system. FIG. 3 illustrates suitable functionality of the hardware of FIG. 2 in connection with software and operating system functionality, as will be appreciated by one of ordinary skill in the art. The document processing device 300 suitably includes an engine 302, which facilitates one or more document processing operations.

The document processing engine 302 suitably includes a print engine 304, facsimile engine 306, scanner engine 308, and console panel 310. The print engine 304 allows for output of physical documents representative of an electronic document communicated to the processing device 300. The facsimile engine 306 suitably communicates to or from external facsimile devices via a device such as a fax modem.

The scanner engine 308 suitably functions to receive hard copy documents and, in turn, image data corresponding thereto. A suitable user interface such as the console panel 310 suitably allows for input of instructions and display of information to an associated user. It will be appreciated that the scanner engine 308 is suitably used in connection with input of tangible documents into electronic form in bitmapped, vector, or page description language format and is also suitably configured for optical character recognition. Tangible document scanning also suitably functions to facilitate facsimile output thereof.

In the illustration of FIG. 3, the document processing engine also comprises an interface 316 with a network via driver 326 suitably comprised of a network interface card. It will be appreciated that a network thoroughly accomplishes that interchange via any suitable physical and non-physical layer such as wired, wireless, or optical data communication.

The document processing engine 302 is suitably in data communication with one or more device drivers 314, which device drivers 314 allow for data interchange from the document processing engine 302 to one or more physical devices to accomplish the actual document processing operations. Such document processing operations include one or more of printing via driver 318, facsimile communication via driver 320, scanning via driver 322, and user interface functions via driver 324. It will be appreciated that these various devices are integrated with one or more corresponding engines associated with the document processing engine 302. It is to be appreciated that any set or subset of document processing operations are contemplated herein. Document processors that include a plurality of available document processing options are referred to as multi-function peripherals.

Figure 4:
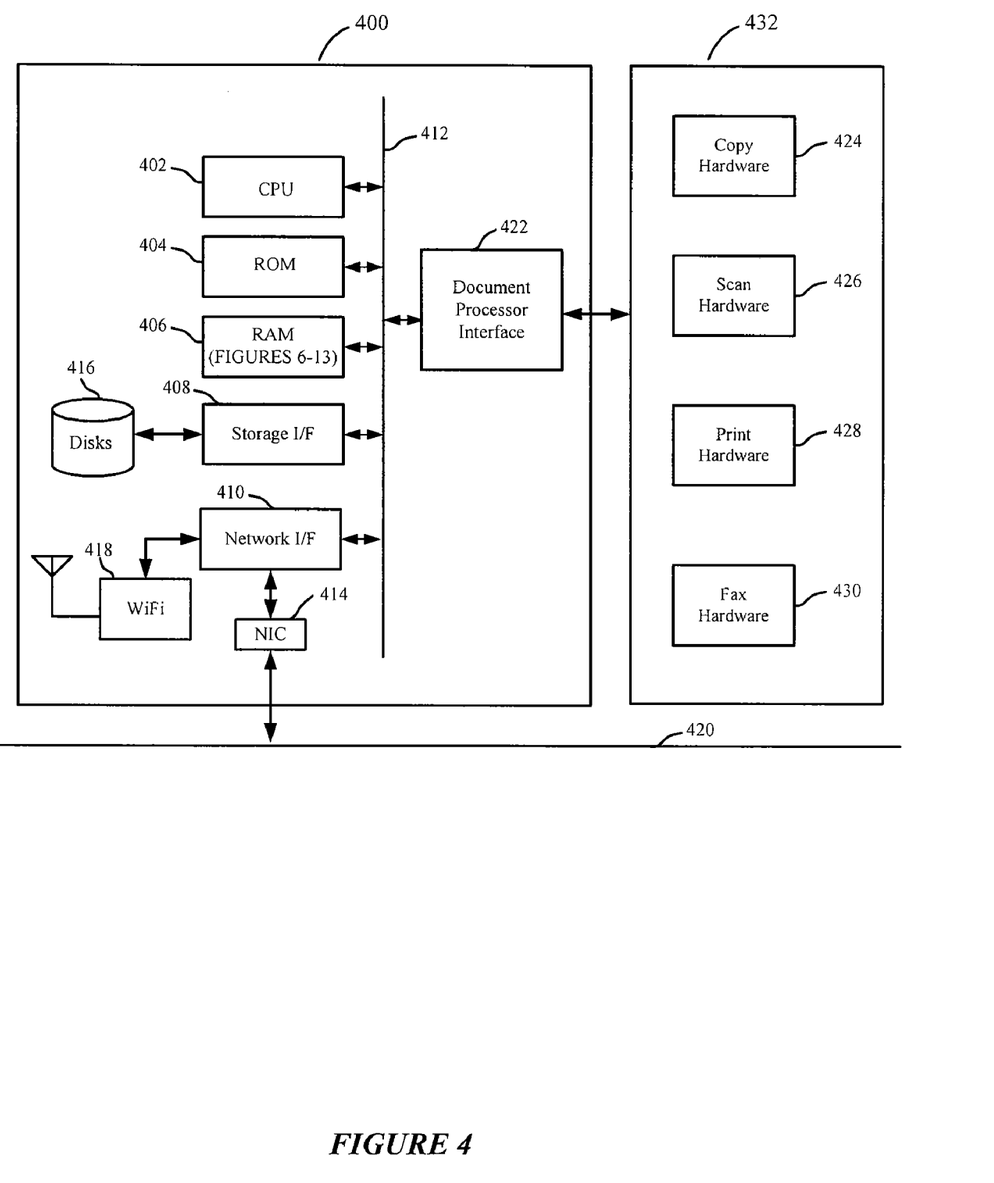
FIG. 4 is a block diagram illustrating controller hardware for use in the document processing device user interface system having functional controls specified by device attribute querying according to one embodiment of the subject application.

Turning now to FIG. 4, illustrated is a representative architecture of a suitable backend component, i.e., the controller 400, shown in FIG. 1 as the controller 108, on which operations of the subject system 100 are completed. The skilled artisan will understand that the controller 400 is representative of any general computing device known in the art that is capable of facilitating the methodologies described herein. Included is a processor 402 suitably comprised of a central processor unit. However, it will be appreciated that processor 402 may be advantageously composed of multiple processors working in concert with one another, as will be appreciated by one of ordinary skill in the art. Also included is a non-volatile or read only memory 404, which is advantageously used for static or fixed data or instructions such as BIOS functions, system functions, system configuration data, and other routines or data used for operation of the controller 400.

Also included in the controller 400 is random access memory 406 suitably formed of dynamic random access memory, static random access memory, or any other suitable addressable and writable memory system. Random access memory 406 provides a storage area for data instructions associated with applications and data handling accomplished by processor 402.

A storage interface 408 suitably provides a mechanism for non-volatile, bulk, or long-term storage of data associated with the controller 400. The storage interface 408 suitably uses bulk storage, such as any suitable addressable or serial storage such as a disk, optical, tape drive, and the like as shown as 416, as well as any suitable storage medium, as will be appreciated by one of ordinary skill in the art.

A network interface subsystem 410 suitably routes input and output from an associated network, allowing the controller 400 to communicate to other devices. The network interface subsystem 410 suitably interfaces with one or more connections with external devices to the device 400. By way of example, illustrated is at least one network interface card 414 for data communication with fixed or wired networks such as Ethernet, Token-Ring, and the like and a wireless interface 418 suitably adapted for wireless communication via means such as WiFi, WiMax, wireless modem, cellular network, or any suitable wireless communication system. It is to be appreciated, however, that the network interface subsystem 410 suitably utilizes any physical or non-physical data transfer layer or protocol layer, as will be appreciated by one of ordinary skill in the art. In the illustration, the network interface 414 is interconnected for data interchange via a physical network 420 suitably comprised of a local area network, wide area network, or a combination thereof.

Data communication between the processor 402, read only memory 404, random access memory 406, storage interface 408, and the network interface subsystem 410 is suitably accomplished via a bus data transfer mechanism, such as illustrated by bus 412.

Also in data communication with the bus 412 is a document processor interface 422. The document processor interface 422 suitably provides connection with hardware 432 to perform one or more document processing operations. Such operations include copying accomplished via copy hardware 424, scanning accomplished via scan hardware 426, printing accomplished via print hardware 428, and facsimile communication accomplished via facsimile hardware 430. It is to be appreciated that the controller 400 suitably operates any or all of the aforementioned document processing operations. Systems accomplishing more than one document processing operation are commonly referred to as multifunction peripherals or multifunction devices.

Figure 5:
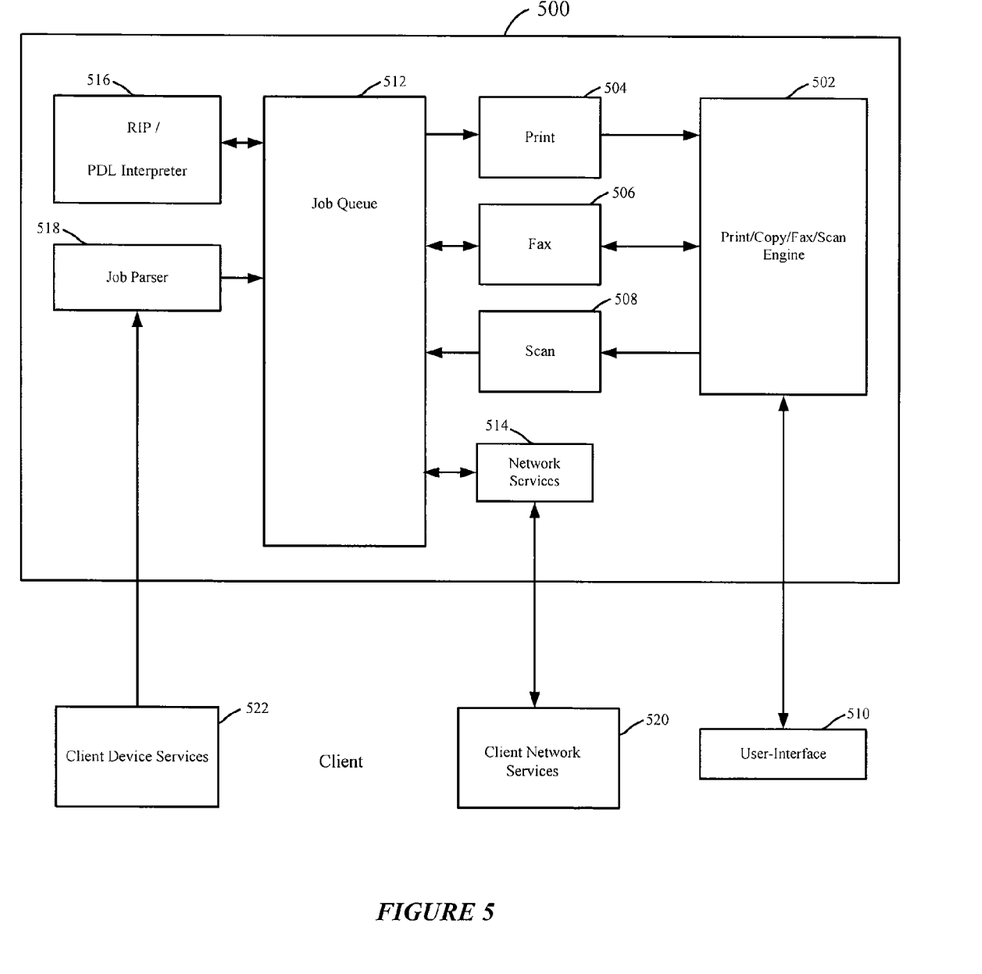
FIG. 5 is a functional diagram illustrating the controller for use in the document processing device user interface system having functional controls specified by device attribute querying according to one embodiment of the subject application.

Functionality of the subject system 100 is accomplished on a suitable document processing device, such as the document processing device 104, which includes the controller 400 of FIG. 4 (shown in FIG. 1 as the controller 108) as an intelligent subsystem associated with a document processing device. In the illustration of FIG. 5, controller function 500 in the preferred embodiment includes a document processing engine 502. Suitable controller functionality is that incorporated into the Toshiba e-Studio system in the preferred embodiment. FIG. 5 illustrates suitable functionality of the hardware of FIG. 4 in connection with software and operating system functionality, as will be appreciated by one of ordinary skill in the art.

In the preferred embodiment, the engine 502 allows for printing operations, copy operations, facsimile operations, and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited-purpose document processing devices that perform one or more of the document processing operations listed above.

The engine 502 is suitably interfaced to a user interface panel 510, which panel 510 allows for a user or administrator to access functionality controlled by the engine 502. Access is suitably enabled via an interface local to the controller or remotely via a remote thin or thick client.

The engine 502 is in data communication with the print function 504, facsimile function 506, and scan function 508. These functions 504, 506, 508 facilitate the actual operation of printing, facsimile transmission and reception, and document scanning for use in securing document images for copying or generating electronic versions.

A job queue 512 is suitably in data communication with the print function 504, facsimile function 506, and scan function 508. It will be appreciated that various image forms such as bit map, page description language or vector format, and the like are suitably relayed from the scan function 308 for subsequent handling via the job queue 512.

The job queue 512 is also in data communication with network services 514. In a preferred embodiment, job control, status data, or electronic document data is exchanged between the job queue 512 and the network services 514. Thus, suitable interface is provided for network-based access to the controller function 500 via client side network services 520, which is any suitable thin or thick client. In the preferred embodiment, the web services access is suitably accomplished via a hypertext transfer protocol, file transfer protocol, uniform data diagram protocol, or any other suitable exchange mechanism. The network services 514 also advantageously supplies data interchange with client side services 520 for communication via FTP, electronic mail, TELNET, or the like. Thus, the controller function 500 facilitates output or receipt of electronic document and user information via various network access mechanisms.

The job queue 512 is also advantageously placed in data communication with an image processor 516. The image processor 516 is suitably a raster image process, page description language interpreter, or any suitable mechanism for interchange of an electronic document to a format better suited for interchange with device functions such as print 504, facsimile 506, or scan 508.

Finally, the job queue 512 is in data communication with a parser 518, which parser 518 suitably functions to receive print job language files from an external device such as client device services 522. The client device services 522 suitably include printing, facsimile transmission, or other suitable input of an electronic document for which handling by the controller function 500 is advantageous. The parser 518 functions to interpret a received electronic document file and to relay it to the job queue 512 for handling in connection with the afore-described functionality and components.

Figure 6:
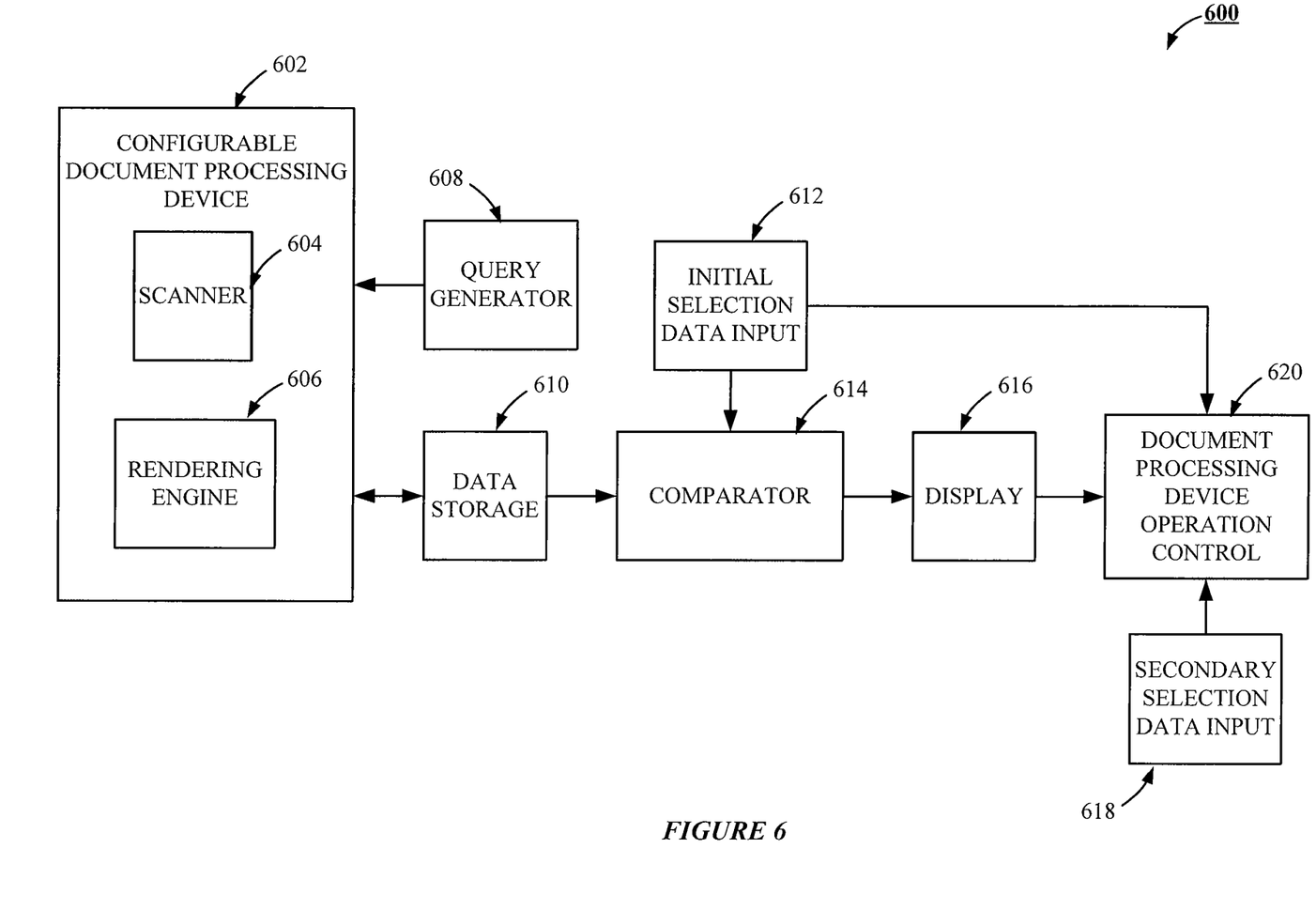
FIG. 6 is a block diagram illustrating the document processing device user interface system having functional controls specified by device attribute querying according to one embodiment of the subject application.

Turning now to FIG. 6, illustrated is a block diagram of a document processing device user interface system 600 having functional controls specified by device attribute querying in accordance with one embodiment of the subject application. The system 600 includes a configurable document processing device 602 that incorporates a scanner 604 and a rendering engine 606. The system 600 also includes a query generator 608 that is in data communication with each of a plurality of document processing device components associated with the document processing device 602. The system also includes a data storage 610 that is configured to store device state data corresponding to an operative state of each of the document processing device components resulting from query data generated from the query generator 608.

The system 600 also employs a document processing operation initial selection data input 612 and a comparator 614. The comparator 614 is suitably configured to be operable based upon the device data in the data storage 610 and document processing operation initial selection data received via the input 612. The system 600 further comprises a display 616 that includes indicia corresponding to each of a subset of functional controls specified by the output of the comparator 614. Additionally, the system 600 employs a secondary selection data input 618, which is operable on data corresponding to the subset of functional controls, and a document processing device operation control 620, which is operable on initial selection data and secondary selection data received via the initial selection data input 612 and the secondary selection data input 618, respectively.

Figure 7:
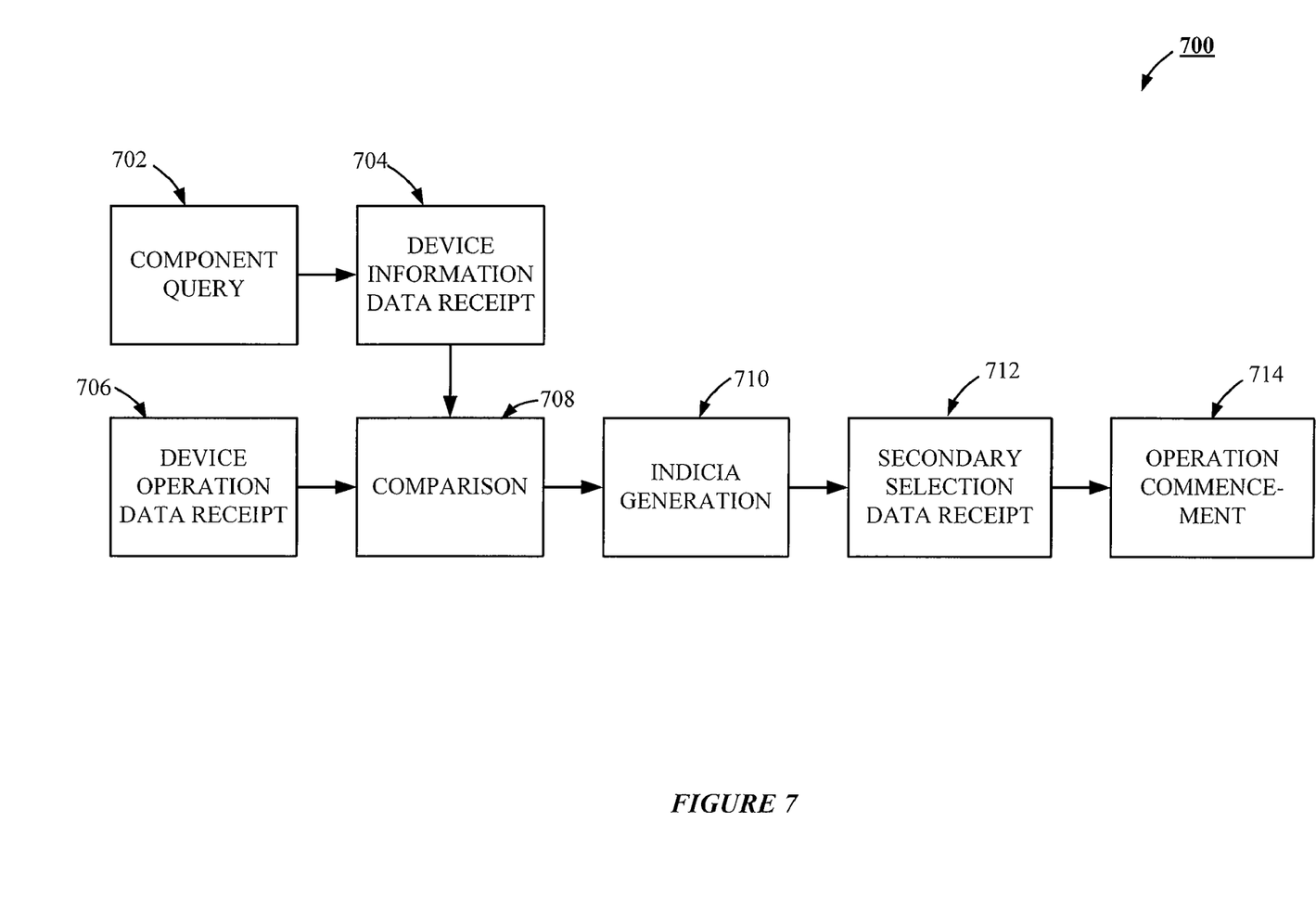
FIG. 7 is a functional diagram illustrating the document processing device user interface system having functional controls specified by device attribute querying according to one embodiment of the subject application.

Referring now to FIG. 7, there is shown a functional diagram illustrating the document processing device user interface system 700 having functional controls specified by device attribute querying in accordance with one embodiment of the subject application. A component query 702 is first performed on components associated with a document processing device (not shown). Device information data receipt 704 then occurs of data corresponding to the operational characteristics of each of the components in response to the component query 702. Device operation data receipt 706 then occurs via an associated user interface of device operation data corresponding to a selected document processing operation for the document processing device. A comparison 708 is then performed of the device information data relative to the device operation data.

Indicia generation 710 then occurs on a display associated with the user interface that corresponds to controls of a subset of the components based upon an output of the comparison 708. Secondary selection data receipt 712 occurs of data corresponding to at least one of the indicia generated 710 on the display. Operation commencement 714 is then undertaken of the selected document processing operation in accordance with received secondary selection data 712.

Figure 8:
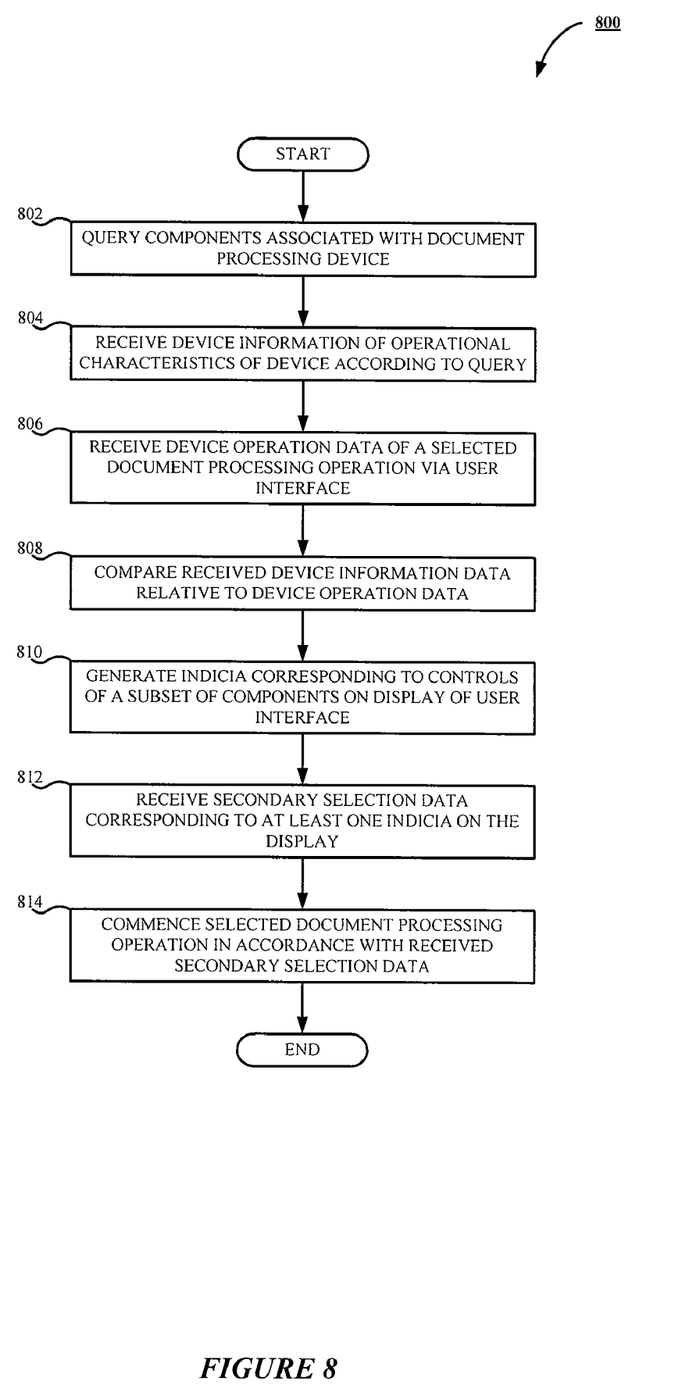
FIG. 8 is a flowchart illustrating a document processing device user interface method having functional controls specified by device attribute querying according to one embodiment of the subject application.

The skilled artisan will appreciate that the subject system 100 and components described above with respect to FIG. 1, FIG. 2, FIG. 3, FIG. 4, FIG. 5, FIG. 6, and FIG. 7 will be better understood in conjunction with the methodologies described hereinafter with respect to FIG. 8 and FIG. 9, and the example interfaces of FIG. 10, FIG. 11, FIG. 12, and FIG. 13. Turning now to FIG. 8, there is shown a flowchart 800 illustrating a document processing device user interface method having functional controls specified by device attribute querying in accordance with one embodiment of the subject application. Beginning at step 802, a plurality of components associated with the document processing device 104 are queried for operational characteristics. In accordance with one embodiment of the subject application, such components include, for example and without limitation, sheet stock input components, printed sheet output components, document data input components, document data output components, and the like. Device information corresponding to the operational characteristics of each of the components is then received at step 804.

At step 806, device operation data is received via the user interface 106, the kiosk 114, or the like, which corresponds to at least one selected document processing operation for the document processing device 104. The controller 108 or other suitable component associated with the document processing device 104 then compares the received device information relative to the received device operation data at step 808. Indicia is then generated at step 810 via the user interface 106, the display 116 associated with the kiosk 114, or the like corresponding to controls of a subset of the components based upon an output of the comparison performed at step 808. According to one example embodiment of the subject application, a suitable graphical user interface is generated via the user interface 106 or display 116 so as to display the indicia to an associated user, as will be understood by those skilled in the art.

The controller 108 or other suitable component associated with the document processing device 104 then receives secondary selection data via the user interface 106, the kiosk 114, or the like corresponding to at least one displayed indicia at step 812. At step 814, the controller 108 then directs the commencement of the selected document processing operation in accordance with received secondary selection data on the document processing device 104.

Figure 9:
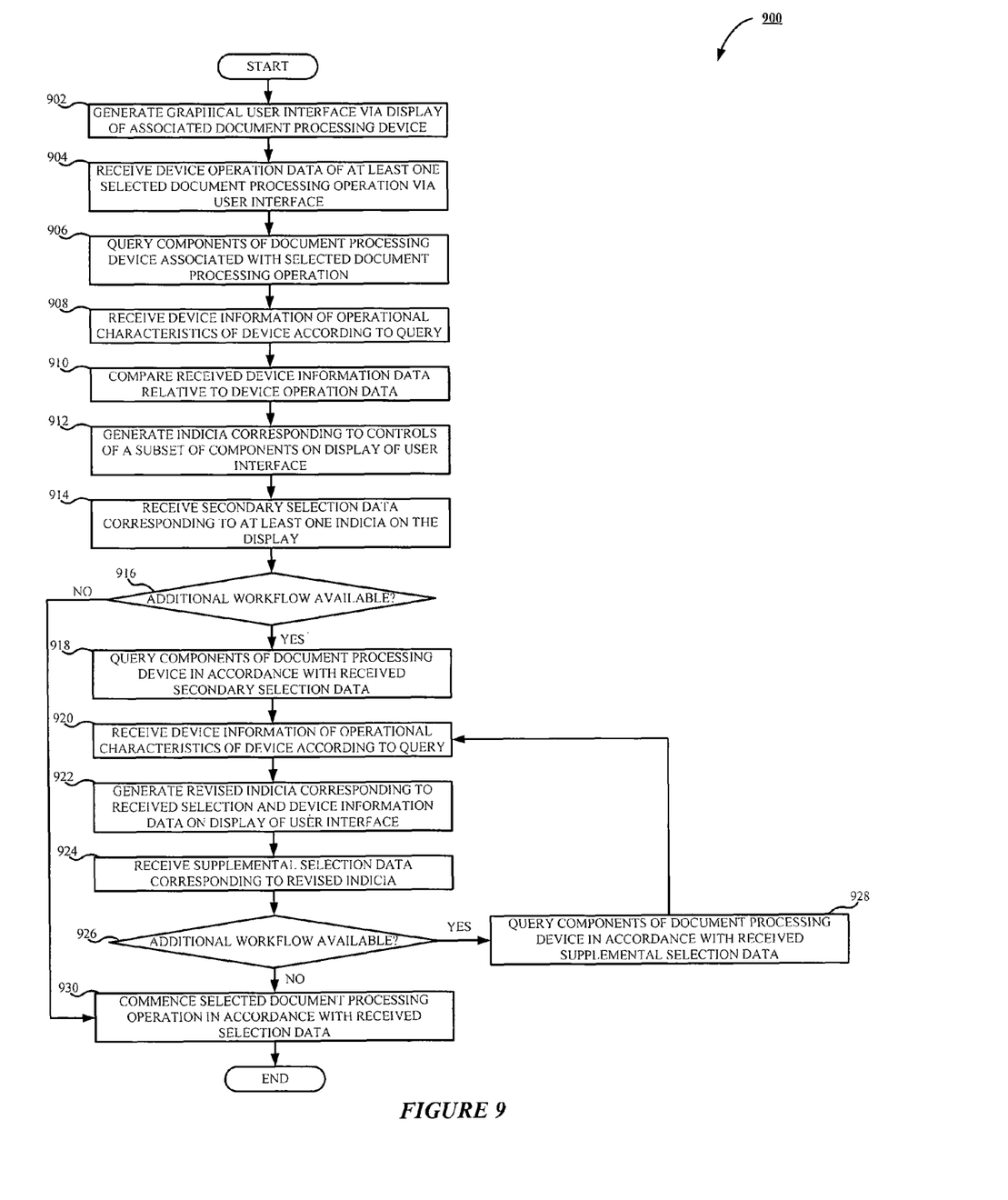
FIG. 9 is a flowchart illustrating a document processing device user interface method having functional controls specified by device attribute querying according to one embodiment of the subject application.
Figure 10:
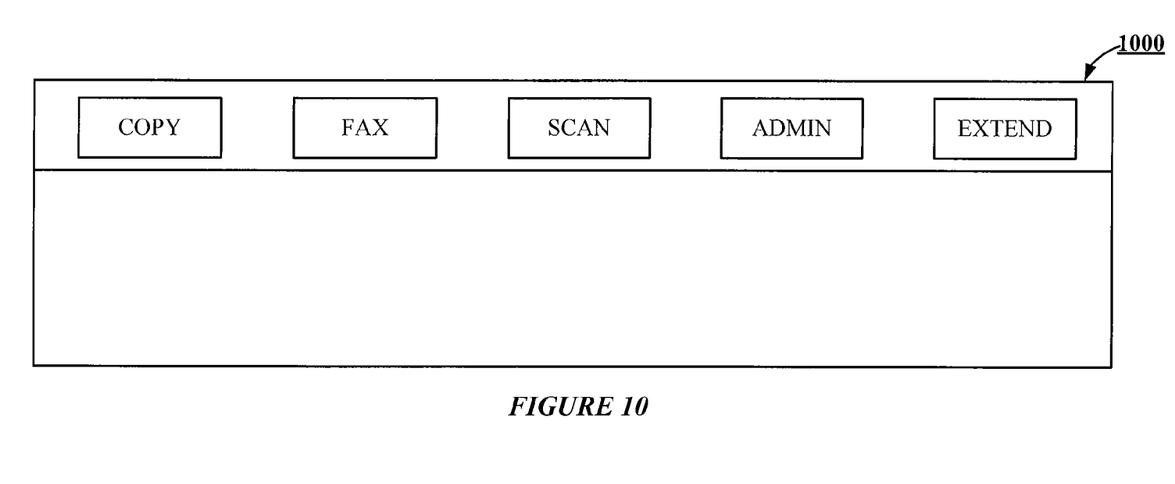
FIG. 10 is a diagram illustrating a template document processing user interface in accordance with the interface system and method having functional controls specified by device attribute querying according to one embodiment of the subject application.

Referring now to FIG. 9, there is shown a flowchart 900 illustrating a document processing device user interface method having functional controls specified by device attribute querying in accordance with one embodiment of the subject application. The methodology of FIG. 9 begins at step 902, whereupon a graphical user interface is generated via the user interface 106, the display 116 associated with the kiosk 114, or other suitable component associated with the document processing device 104. It will be appreciated by those skilled in the art that the graphical user interface is representative of any suitable interface known in the art including icons, graphical representations of document processing operations, pull-down menus, pop-up menus, or the like. FIG. 10 illustrates a suitable template document processing user interface 1000 on the user interface 106, display 116, or the like in accordance with one embodiment of the subject application. As depicted in FIG. 10, the interface 1000 includes a set of icons corresponding to operations capable of being performed by the associated document processing device 104. At step 904, the controller 108 or other suitable component associated with the document processing device 104 receives device operation data of at least one selected document processing operation via the user interface 106, the kiosk 114, or the like. The skilled artisan will appreciate that such document processing operations include, for example and without limitation, copy, scan, facsimile, administrative, electronic mail, form production, print, and the like.

Figure 11:
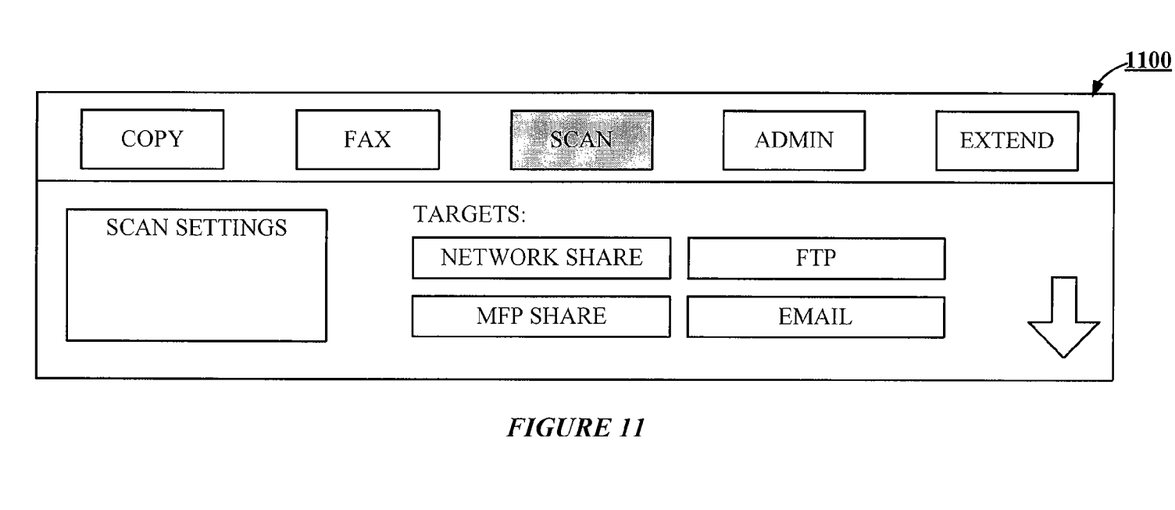
FIG. 11 is a diagram illustrating a template document processing user interface in accordance with the interface system and method having functional controls specified by device attribute querying according to one embodiment of the subject application.

At step 906, components of the document processing device 104 are queried in accordance with the received device operation data. That is, the controller 108 or other suitable component associated with the document processing device 104 queries those components associated with the workflow of the selected document processing operation, e.g. for a print operation, a feed stock component, printer engine component, toner component, and the like for status. Device information is then received from the queried components at step 908 corresponding to the operational characteristics thereof in response to the query from the controller 108. At step 910, a comparison is performed of the received device information data relative to the device operation data via the controller 108 or other suitable component associated with the document processing device 104. Indicia are then generated via the user interface 106, the display 116, or the like that corresponds to controls of a subset of components associated with the selected document processing operation at step 912. FIG. 11 illustrates a template document processing device user interface 1100 in which a desired operation has been selected, e.g. a scan operation. As shown in FIG. 11, the user interface 1100 corresponding to a selected scan operation includes subsequent indicia for additional components to be implemented in performing the selected scan operation.

Secondary selection data is then received from the associated user via the user interface 106, the kiosk 114, or the like at step 914. Preferably, the secondary selection data corresponds to at least one of the indicia displayed at step 912. For example, when the user has selected the scan operation, the control indicia suitably includes scan settings such as target destinations, electronic mail settings, file transfer protocol settings, and the like. A determination if then made at step 916 whether any additional workflow associated with the selected document processing operation remains; that is, whether additional user selections are required for performing the selected document processing operation. When no additional workflow is necessary, flow proceeds to step 930, whereupon the controller 108 or other suitable component associated with the document processing device 104 directs the commencement of the selected document processing operation in accordance with the received selection data, e.g. the initial and secondary selection data.

Figure 12:
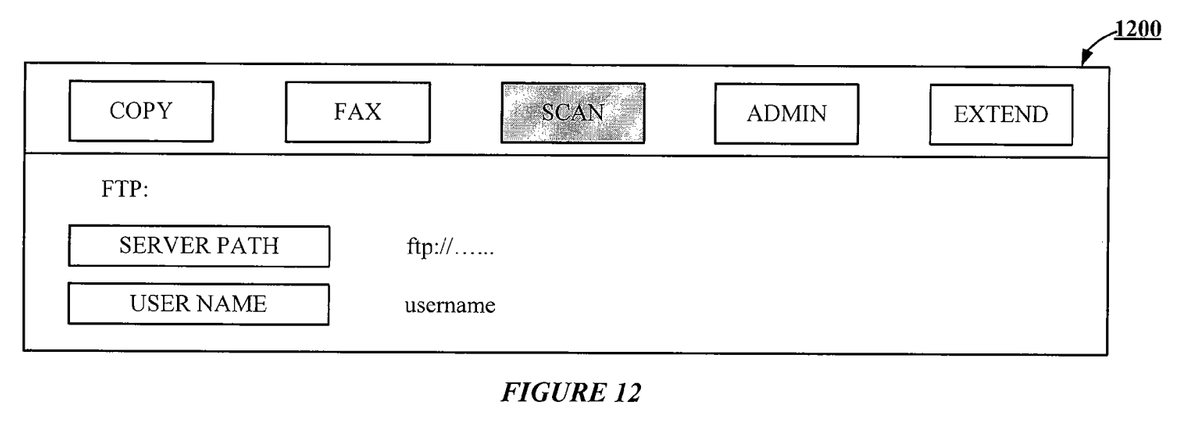
FIG. 12 is a diagram illustrating a template document processing user interface in accordance with the interface system and method having functional controls specified by device attribute querying according to one embodiment of the subject application.

Upon a determination at step 916 that additional workflow remains available, operations proceed to step 918. At step 918, additional components associated with the selected document processing operation are queried by the controller 108 or other suitable component associated with the document processing device 104 in accordance with the received secondary selection data. The controller 108 or other suitable component associated with the document processing device 104 then receives device information of operational characteristics of the document processing device 104 in response to the query at step 920. Revised indicia is then generated at step 922 via the display, e.g. the user interface 106, the display 116, or the like, corresponding to the received secondary selection data and the received device information. FIG. 12 illustrates a template document processing device user interface 1200 corresponding to revised indicia generated in association with the additional workflow. That is, the user interface 1200 depicts the additional workflow for completing a scanning operation, wherein a file transfer protocol has been selected. The revised indicia prompts the user for a server path, e.g. the server name, and a username. The skilled artisan will appreciate that a password is also capable of being required for uploading the results of the scanning operation to the ftp server.

Supplemental selection data corresponding to a user selection of at least one revised indicia is then received by the controller 108 or other suitable component associated with the document processing device 104 at step 924. A determination is then made at step 926 whether any additional workflow remains corresponding to the selected document processing operation. For example, when the selected document processing operation is a facsimile operation, the secondary selection data is capable of including, for example and without limitation, a facsimile number, a facsimile resolution, or the like, and then the supplemental selection data is capable of corresponding to a subsequent component or input associated with completing the selected operation.

Figure 13:
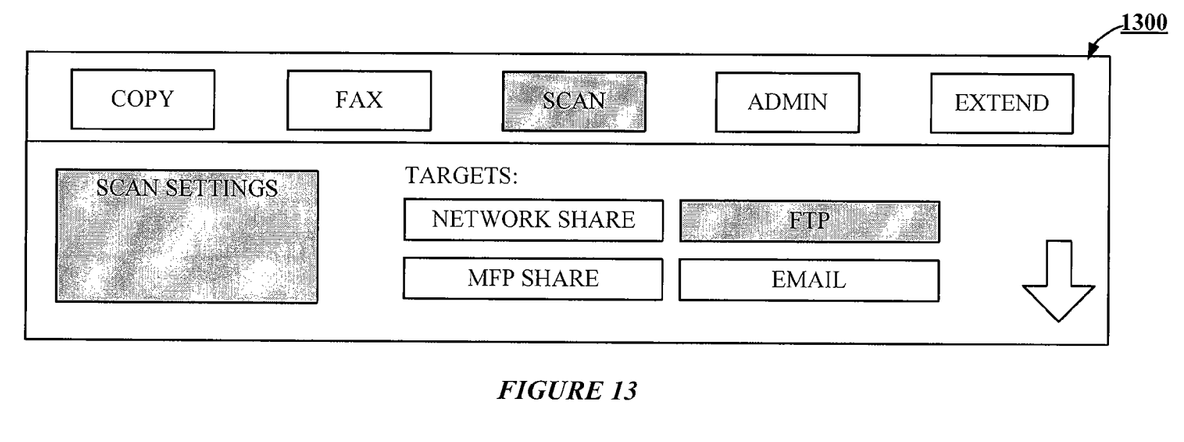
FIG. 13 is a diagram illustrating a template document processing user interface in accordance with the interface system and method having functional controls specified by device attribute querying according to one embodiment of the subject application.

Upon a determination at step 926 that additional workflow remains available, flow proceeds to step 928, whereupon components of the document processing device 104 are queried in accordance with the received supplemental selection data. Thereafter, operations return to step 920 for receipt of device information of operational characteristics according to the query of step 928. Operations continue thereafter with respect to steps 922-926, as set forth above. Upon a determination at step 926 that no additional workflow remains available corresponding to the selected document processing operation, flow proceeds to step 930. At step 930, the selected document processing operation is commenced by the document processing device 104 in accordance with the received selection data. FIG. 13 illustrates a user interface 1300 demonstrating the customization in accordance with workflow querying of device components in accordance with one example embodiment of the subject application.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally, and equitably entitled.

What is claimed:

1. A document processing device user interface system having functional controls specified by device attribute querying, comprising:
    a primary selection data input for receiving an initial document processing operation selection from a user input via a user interface, the initial document processing operation selected from the group comprising printing, copying, scanning, emailing or sending via facsimile a document;
    a query generator for communicating with each of a plurality of document processing device components in a configurable document processing device, the document processing device components including a scanner and rendering engine;
    a document processing device component data input for receiving operational characteristics, including functional capabilities, from each of the document processing device components in response to a query generated by the query generator;
    a data storage device for storing the operational characteristics for each of the document processing device components;
    a display for displaying indicia corresponding to functional controls for the operational characteristics associated with the initial document processing operation selection;
    a secondary selection data input operable to receive a secondary document processing operation selection from the user input via the user interface by selecting one of the functional controls; and
    a document processing device operation control operable to cause the document processing device to commence a document processing operation in response to receipt of the initial document processing operation selection and the secondary document processing operation selection via the user interface.

2. The system of claim 1, further comprising
    a supplemental selection data input operable to receive a supplemental document processing operation selection; and
    the document processing device operation control further operable to cause the document processing device to commence the document processing operation as further directed by the supplemental document processing operation selection.

3. A document processing device user interface method having functional controls specified by device attribute querying, comprising:
    querying a plurality of document processing device components in order to obtain operational characteristics, including the functional capabilities, for each of a plurality of document processing device components, the document processing device components including a scanner and a rendering engine;
    receiving the operational characteristics of each of the plurality of document processing device components;
    receiving, via a user interface, an initial document processing operation selection corresponding to a selected document processing operation identified by the operational characteristics, the initial document processing operation selected from the group comprising printing, copying, scanning, emailing or sending via facsimile a document;
    displaying indicia, on the user interface, corresponding to functional controls identified by the operational characteristics associated with the initial document processing operation selection;
    receiving a secondary document processing operation selection corresponding to at least one indicia on the user interface; and
    commencing a document processing operation in response to receipt of the initial document processing operation selection and the secondary document processing selection via the user interface.

4. The method of claim 3, further comprising:
    receiving a supplemental document processing selection; and
    commencing the document processing operation as further directed by the supplemental document processing selection.

5. The method of claim 4, wherein the querying is initiated after each user interaction with the user interface so as to refresh received device information data.

6. The method of claim 3, wherein the document processing device components include at least one of a sheet stock input and a printed sheet output.

7. The method of claim 3, wherein the document processing device components include at least one of document data input and document data output.

8. A document processing device user interface system having functional controls specified by device attribute querying, comprising:
    querying means for generating a query to a plurality of components associated with a document processing device;

means for receiving device information data corresponding to operational characteristics of each of the plurality of components in response to the query;
a user interface including a display and data input;
means for receiving, via the user interface, a selection of a selected document processing operation for completion by the document processing device, the document processing operation selected from the group comprising printing, copying, scanning, emailing or sending via facsimile a document;
means for generating indicia on the user interface corresponding to controls of a subset of the plurality of components in response to the receipt of the selection;
means for receiving secondary selection data corresponding to at least one indicia on the user interface, the secondary selection data indicating a subsidiary setting associated with the document processing operation; and
control means for commencing the selected document processing operation in accordance with the secondary selection data.

9. The system of claim 8, further comprising:
means for generating revised indicia on the user interface in response to the selection data and device information data;
means for receiving supplemental selection data corresponding to at least one revised indicia; and
wherein the control means is further for commencing the selected document processing operation in accordance with supplemental selection data.

10. The system of claim 9, wherein the querying means is initiated after each received selection data so as to refresh received device information data.

11. The system of claim 8, wherein the components include at least one of a sheet stock input components and a printed sheet output components.

12. The system of claim 8, wherein the components include at least one of document data input component and document data output component.

* * * * *